United States Patent
Feris et al.

(10) Patent No.: US 8,331,674 B2
(45) Date of Patent: Dec. 11, 2012

(54) RULE-BASED COMBINATION OF A HIERARCHY OF CLASSIFIERS FOR OCCLUSION DETECTION

(75) Inventors: Rogerio Feris, White Plains, NY (US); Arun Hampapur, Norwalk, CT (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1305 days.

(21) Appl. No.: 11/697,535

(22) Filed: Apr. 6, 2007

(65) Prior Publication Data
US 2008/0247609 A1 Oct. 9, 2008

(51) Int. Cl.
*G06K 9/00* (2006.01)
(52) U.S. Cl. ........................... 382/181; 382/224
(58) Field of Classification Search .............. 382/103, 382/181
See application file for complete search history.

(56) References Cited

U.S. PATENT DOCUMENTS

| | | | |
|---|---|---|---|
| 6,184,926 B1 * | 2/2001 | Khosravi et al. | 348/239 |
| 6,915,025 B2 * | 7/2005 | Wang et al. | 382/289 |
| 7,310,442 B2 * | 12/2007 | Monachino et al. | 382/156 |
| 2002/0076100 A1 * | 6/2002 | Luo | 382/164 |
| 2003/0099395 A1 * | 5/2003 | Wang et al. | 382/165 |
| 2003/0108334 A1 * | 6/2003 | Nevenka et al. | 386/95 |
| 2003/0215141 A1 * | 11/2003 | Zakrzewski et al. | 382/190 |
| 2004/0042661 A1 * | 3/2004 | Ulrich et al. | 382/181 |
| 2005/0001013 A1 | 1/2005 | Xie et al. | |
| 2005/0002662 A1 | 1/2005 | Arpa et al. | |
| 2006/0120572 A1 | 6/2006 | Li et al. | |
| 2006/0120590 A1 * | 6/2006 | Han et al. | 382/154 |
| 2006/0204040 A1 | 9/2006 | Freeman et al. | |
| 2006/0204053 A1 | 9/2006 | Mori et al. | |
| 2007/0172114 A1 * | 7/2007 | Baker et al. | 382/160 |

FOREIGN PATENT DOCUMENTS

| | | |
|---|---|---|
| EP | 1355274 | 10/2003 |
| JP | 2000-331251 | 11/2000 |
| JP | 2006-262527 | 9/2006 |

OTHER PUBLICATIONS

Y. Li, S. Gong, and H. Liddell, Support Vector Regression and Classification Based Multi-View Face Detection and Recognition, Proc. IEEE Int'l Conf. Automatic Face and Gesture Recognition, pp. 300-305, 2000.*

J. Kim, et al., A New Video Surveillance System Employing Occluded Face Detection; Int'l Conf. on Innovations in Applied Artificial Intelligence; Bari, Italy; 2005; pp. 65-68.

Chen, et al., Modification of the AdaBoost-based Detector for Partially Occluded Faces; 18th Int'l Conf on Pattern Recognition (ICPR'06); 2006; 4 pages.

(Continued)

*Primary Examiner* — Hadi Akhavannik
(74) *Attorney, Agent, or Firm* — Tutunjian & Bitetto, P.C.; Preston Young

(57) ABSTRACT

An occlusion detection system and method include a decomposer configured to decompose an image into a set of hierarchical parts. A hierarchy of classifiers is employed to detect features in the image and the hierarchical parts. A logical operation is configured to logically combine a classification result from at least two of the classifiers to detect an occlusion state of the image.

32 Claims, 7 Drawing Sheets

OTHER PUBLICATIONS

Heisele et al., Component-based Face Detection; IEEE; 2001; pp. I-657 to I-662.

Kepenekci, et al., Occluded Face Recongition Based on Gabor Wavelets; IEEE ICIP; 2002; pp. I-293 to I-296.

Iulian B. Ciocoiu, Occluded Face Recognition Using Parts-Based Representation Methods; Proceedings of the 2005 European Conference; 2005; 4 pages.

Kittler et al., On Combining Classifiers; IEEE; 1998; pp. 226-229.

Hotta; A Robust Face Detector Under Partial Occlusion; IEEE; 2004; pp. 597-600.

Wen, et al.; The Mask Detection Technology for Occluded Face Analysis in the Surveillance System; Journal of Foresinc Sciences, 2005; pp. 1-9.

* cited by examiner

RULE-BASED COMBINATION OF A HIERARCHY OF CLASSIFIERS FOR OCCLUSION DETECTION

BACKGROUND

1. Technical Field

The present invention generally relates to occlusion detection in images, and more particularly to systems and methods to report whether a particular object in a scene is occluded or not by using a rule-based combination of a hierarchy of visual classifiers.

2. Description of the Related Art

Existing computer vision systems often handle occlusion as a source of noise, rather than a positive source of information. The reason is that occlusion often causes computer vision methods to fail. More specifically, methods like visual object detection, tracking, and recognition, are sensitive to occlusions.

Most available systems do not report whether an object in a scene is occluded or not. They are generally designed to perform visual tasks (like tracking, detection, and recognition) under the presence of occlusion (e.g., using techniques based on robust statistics or subspace learning).

In general, these methods cope only with partial occlusion, and not with full occlusion. For example, there are systems for face detection that use multiple classifiers for different facial features, like nose, mouth, etc. and then verify their spatial arrangement relationship (e.g., eyes are always above mouth) for detection. However, these methods cannot handle the case where the face is fully occluded by a helmet, for example. The idea of combining multiple classifiers has been used to enhance visual object detection and recognition (e.g., combining a skin-color classifier with an appearance-based classifier to improve face detection). However, these techniques can only detect or recognize objects in the scene, but do not have the capability of reporting whether they are occluded or not.

There has been very little attention in the literature to detect masked persons in surveillance systems. In one such instance, for mask detection technology for occluded face analysis in a surveillance system, Gabor filters and the spatial arrangement of facial features are employed to detect whether a face is occluded or not. However, this approach fails when the face is fully occluded, which is a major problem for surveillance systems.

SUMMARY

Automatically detecting whether an object in the scene is occluded or not is a fundamental operation for smart surveillance systems. As an example, a system can be imagined that can detect whether a human face is being occluded by a mask or not. This would be useful for bank access control or ATM machines, where access could be denied to masked people. Similarly, this technology could be used to detect whether a car has its license plate occluded or missing. Another application would be in the control of public safety in case of infectious diseases, where people are required to wear masks to enter a facility, for example. In this case, the system grant access to people with surgical masks.

Occlusion detection could also be applied for reducing the number of false negatives in surveillance systems that capture people in videos. These systems are often based on storing the face of the person for future search or recognition, but sometimes the face might be occluded because the person is looking down or even walking backwards or away from the camera (i.e., not facing the camera). In these situations, where face detection fails due to partial or full occlusion, the presence of the person (e.g., an image including the full body of the person) should be stored, so that no event is missed.

An occlusion detection system and method include a decomposer configured to decompose an image into a set of hierarchical parts. A hierarchy of classifiers is employed to detect features in the image and the hierarchical parts. A logical operation (rule-based) is configured to logically combine a classification result from at least two of the classifiers to detect an occlusion state of the image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
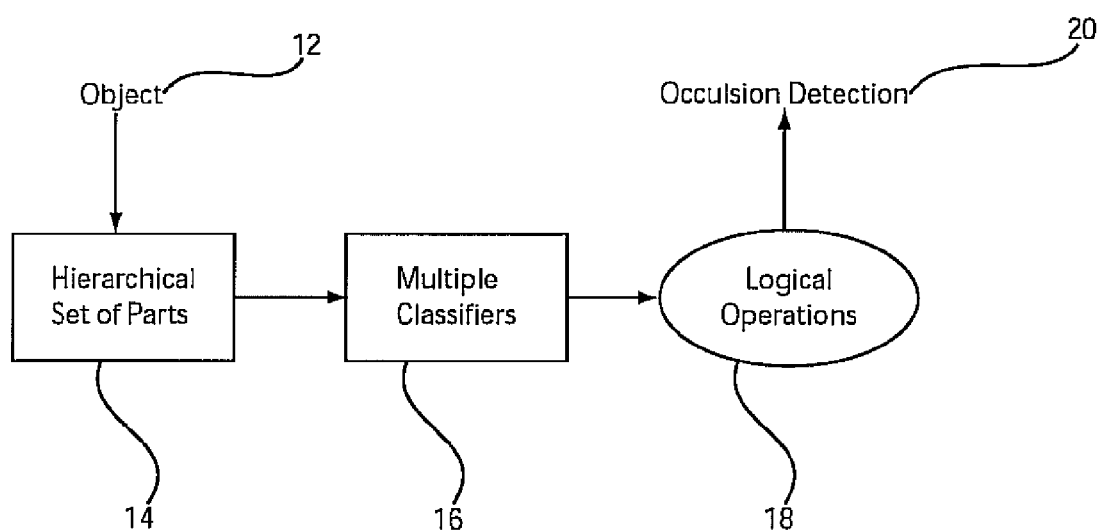
FIG. 1 is a block/flow diagram showing an occlusion detection system/method in accordance with one embodiment.

Present embodiments employ a rule-based combination of multiple classifiers for reporting whether an object is occluded or not in image sequences. In particular, the following principles demonstrate at least: a) A reliable face mask detection system that works even if the face is fully occluded. This method is based on the combination of a person and face classifiers. A similar idea could be applied for other tasks (such as detecting occluded or missing license plates). b) A keyframe selection technique for people captured in surveillance systems that output a face keyframe in case the face is visible, and a person keyframe in case the face is not visible.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram is shown illustrating an occlusion detection system/method 10 for a rule-based combination of a hierarchy of classifiers to detect occluded objects in images in accordance with an exemplary embodiment. An object of interest 12 is decomposed into a hierarchical set of parts in block 14 (decomposer) and classifiers 16 for the different parts. For example, assume the object of interest is a human face. In this case, in addition to a face classifier, high level classifiers could include a full person classifier, and possibly low level classifiers for different facial features, like eyes, nose, and mouth.

Note that for each part, multiple classifiers 16 could be created. As an example, a person classifier could be composed of different classifiers for each pose (e.g., frontal and profile person classifiers). Finally, occlusion detection is reported by applying logical operators 18 (such as OR, AND, NOT) on the classifiers 16.

In one embodiment, rules are applied to different classifiers using logical operators (e.g., AND, OR, NOT, etc.) to detect occlusions under given circumstances.

Two applications will be employed hereinafter to further describe the present principles. These applications include face mask detection and people capture in surveillance videos.

Figure 2:
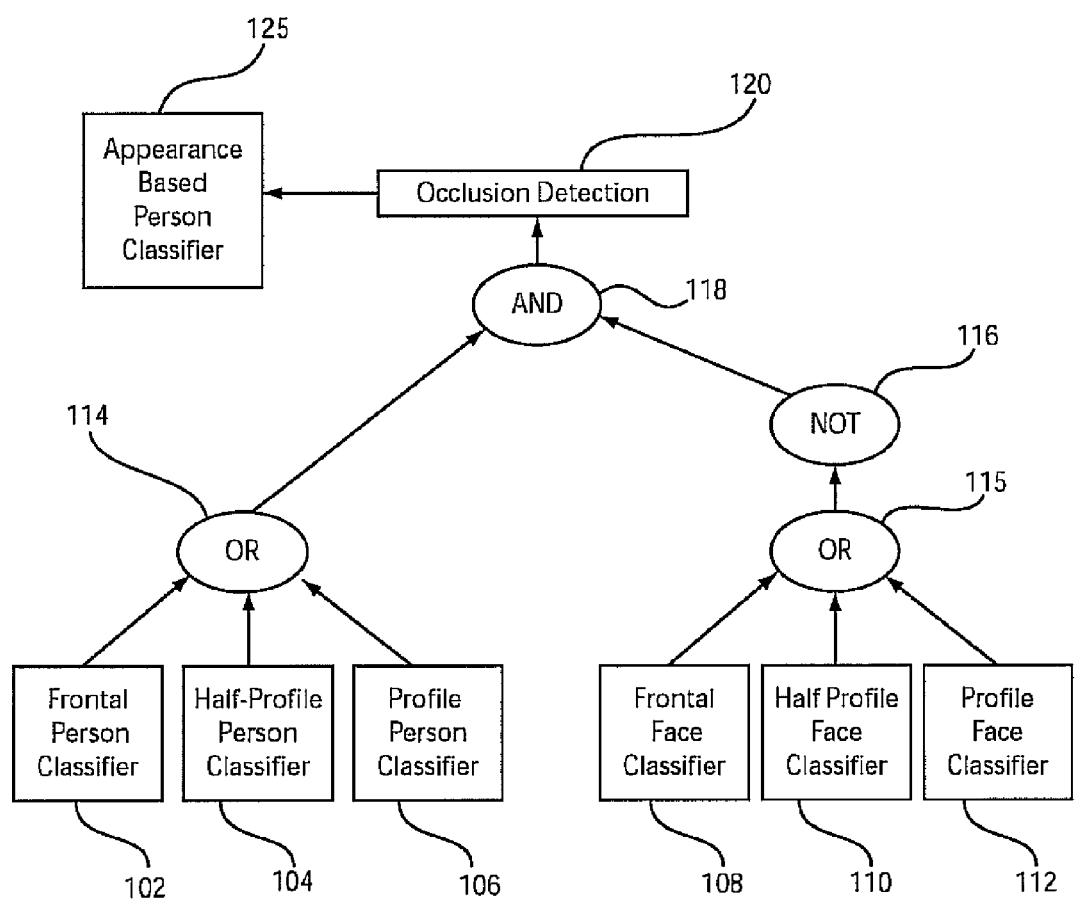
FIG. 2 is a block/flow diagram showing a system/method with a rule-based combination of classifiers for detecting human face occlusion in accordance with another embodiment.

Referring to FIG. 2, a block/flow diagram showing a mask detection application 100 will be employed to illustrate detecting whether a human face is occluded or not in accordance with one example. System 100 employs a rule-based combination of classifiers for detecting human face occlusion.

A combination of multiple classifiers 102, 104, 106, 108, 110 and 112 use logical operators 114, 115, 116 and 118 to report whether a person is present in a scene and to detect is a face is occluded. A person is detected if either a frontal person classifier 1020R (114) a half-profile person-classifier 1040R (114) a profile person classifier 106 reports a positive result.

Similarly, a face is detected if a frontal face classifier 108 OR (115) a half-profile face classifier 110 OR (115) a profile face classifier 112 reports a positive result. The system 100 reports a positive result (occlusion detection 120) if a person is detected AND (118) the face is NOT (116) detected. In other words, if the person is present in the scene, but the face detector fails, that means that the face is partially or fully occluded.

In accordance with one embodiment, a person detector may employ a foreground image region obtained by a background subtraction module based on statistical mixture modeling by known methods. Initially, a test of whether the foreground region satisfies size and aspect ratio constraints to be detected as a person may be performed. If these measurements are satisfied, we report the presence of a person for each view (frontal, half-profile, profile). An appearance-based person detection classifier 125 may be run to confirm the presence of the person in the scene. An appearance-based classifier 125 reports the presence or lack of presence of a person to confirm earlier results. Other face detection methods may be employed which may use the input of a background subtraction module and report the presence and location of faces or persons in the image.

Advantageously, an object detection method (for both face and person detectors) in accordance with the present principles interleaves multiple view-based detectors (frontal, half-profile, and profile) along the temporal domain in a video sequence. Previous methods only run the view-based classifiers in a single frame of the sequence. This slows down the system, since for each frame, the system needs to wait for three classifiers (frontal, half-profile, and profile) to complete their operation and then process the subsequent frame.

The present approach interleaves several classifiers along the frames of the video sequence. More specifically, in a first frame just the frontal classifier 102 (or (108) is run, then in the second frame the half-profile classifier 104 (or 110), in the third frame the profile classifier 106 (or 112), then in the fourth frame the frontal classifier 102 (or 108) again and so forth. This achieves a much faster frame rate, with the same or better detection accuracy. Even if at a specific frame of the sequence, a person has a frontal pose and currently the profile detector is running, the person will not be missed, because in the subsequent frame the frontal detector will catch the person. This is possible due to the fact that cameras capture many frames per second (e.g., 30 frames per second). So it is not possible for a person to keep changing his view/pose at every fraction of a second, meaning that eventually one of the view-based classifiers will catch him. The classifiers are arranged in a rule-based configuration. For example, logical operators (114, 115, 116, 118, etc.) logically combine outputs from the classifiers.

Smart Doors/Real-Time Alerts: In case of an epidemic, e.g., an avian flu emergency, it would be important for a surveillance system to ensure that every person entering a facility is wearing a specific type of safety mask. If the employee is not wearing the prescribed mask, his badge should be de-activated in real-time and his access to the facility denied.

Figure 3:
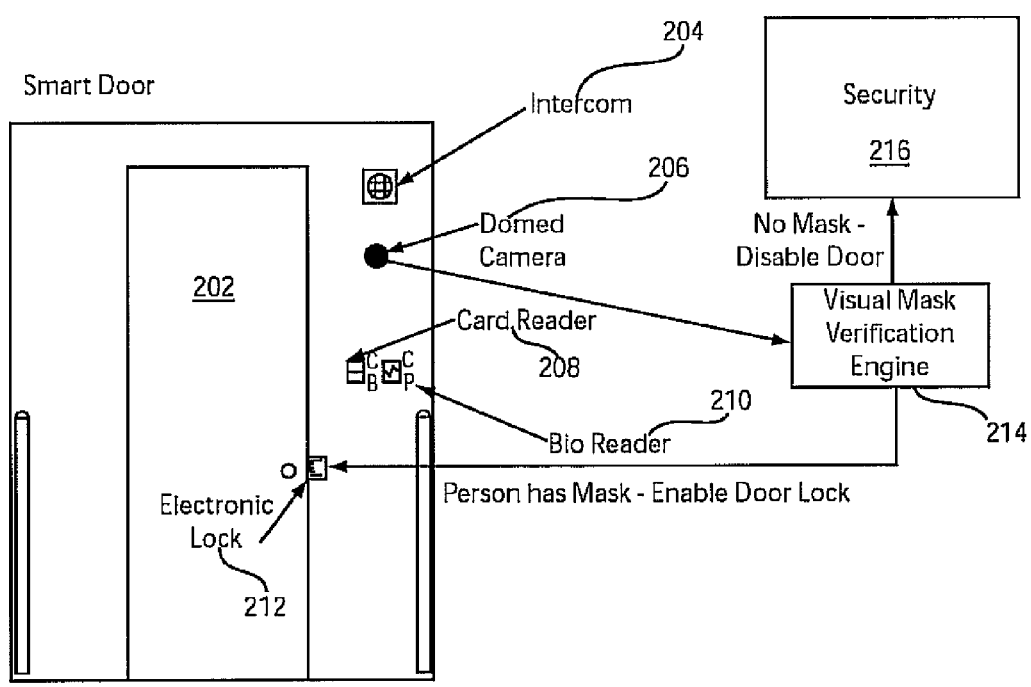
FIG. 3 is a diagram showing a secure entry point which is responsive to an occlusion state of a person attempting access in accordance with one embodiment.

Referring to FIG. 3, an illustrative system 200 includes a smart door 202 for use in the case of an epidemic, e.g., an avian flu emergency. If the system 200 detects that a person is wearing a mask (using our occlusion detection system/method described above), the door 202 automatically opens. e.g., using an electronic lock 212, since a computer 214 running the face mask detector can unlock the door via signals through a parallel port or the like. Door 202 may be a security door which may include one or more of an intercom 204, a card reader 208 (e.g., for badges), a biometric reader 210 (e.g., for iris scans, fingerprint scans, face scans, etc.) and the like.

In case the person is not wearing a mask, their badge is de-activated and a real-time alert is sent to a security guard 216 via the computer network 214. For this specific application, the person and face classifiers also consider the distance between the center of the image and the foreground region, as it is assumed that the person is positioned in front of a camera 206. If more than one person is present on the scene, only the one closest to the center is processed. Evidence is accumulated over the frames before reporting a decision if the person is wearing a mask or not.

The smart door 202 could also be used to grant or deny access to people into banks or ATM machines. In this case, a real-time alert would be sent to a security guard 216 in case the person is wearing a mask.

Capturing people in video sequences is one component of smart surveillance systems. Most available systems use a face detector to store the face image (which may also be called a keyframe) of each person entering and leaving the field of view of the camera. A collection of face images can then be shown to the user during a search process or for face recognition either by the user or by a computer face recognition system.

Ideally, for every person entering or leaving the scene, a face keyframe is generated and stored in the database. However, due to false negatives in face detection, important events might be missed. Moreover, in one surveillance scenario, depending on the direction that the person is walking, only a back view of the person may be captured. In this case, the face is occluded and no keyframes are generated. This problem is addressed by using a keyframe selection technique based on occlusion analysis that combines a face classifier with a person classifier.

Figure 4:
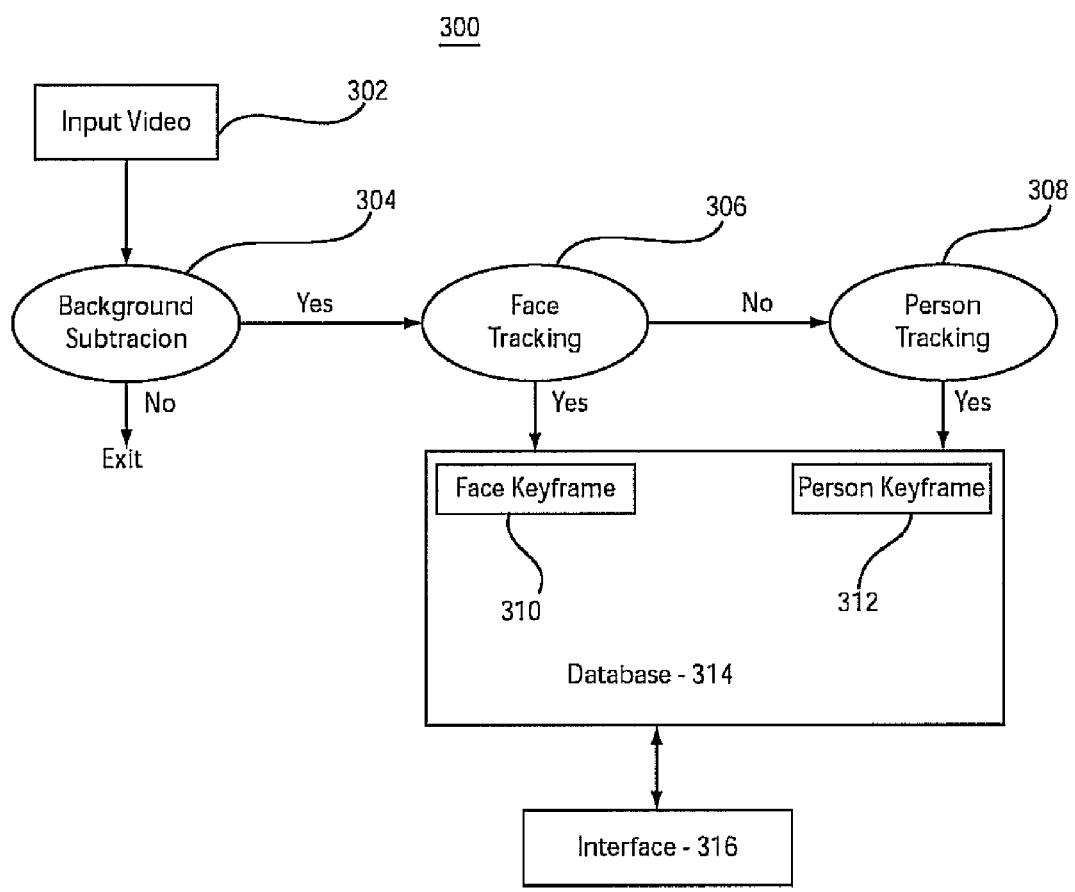
FIG. 4 is a block/flow diagram showing a keyframe selection system/method in accordance with another embodiment, such that if a face is occluded, a person keyframe is generated.

Referring to FIG. 4, a keyframe selection system/method 300 is illustratively shown where if a face is occluded, a person keyframe is generated. A video input 302 includes video of a person. The input video 302 may be processed to improve accuracy or provide better performance. In one embodiment, a background subtraction 304 may be performed to determine whether a person is present in a frame of scene. If a face is detected and tracked in an input video sequence 302, a face keyframe 310 is stored in a database 314. Otherwise, if a face detector 306 fails (meaning that the face is possibly occluded), a person keyframe 312 is generated (and stored in database 314, if a person is detected and tracked in the video by a person tracking device 308.

This keyframe selection method is a useful feature for the surveillance system 300. An interface 316 is provided which can perform searches based only on face keyframes (see FIG. 5) and a more sensitive search which includes both person and face keyframes (see FIG. 6). Searches based only on face keyframes are useful to rapidly recognize people in a surveillance video. The search based on face and person keyframes is useful to guarantee that no event was missed.

For each person that enters and leaves the scene, only one keyframe of the person's face needs to be stored in the database 314. This is accomplished by tracking the person/face in the video sequence and just selecting the face/person image with maximum resolution that was detected by the face/person tracker 306/308. A priority is given to frontal person/faces, meaning that a frontal person/face keyframe would be selected even if a higher resolution profile person/face image was present along the tracking.

Figure 5:
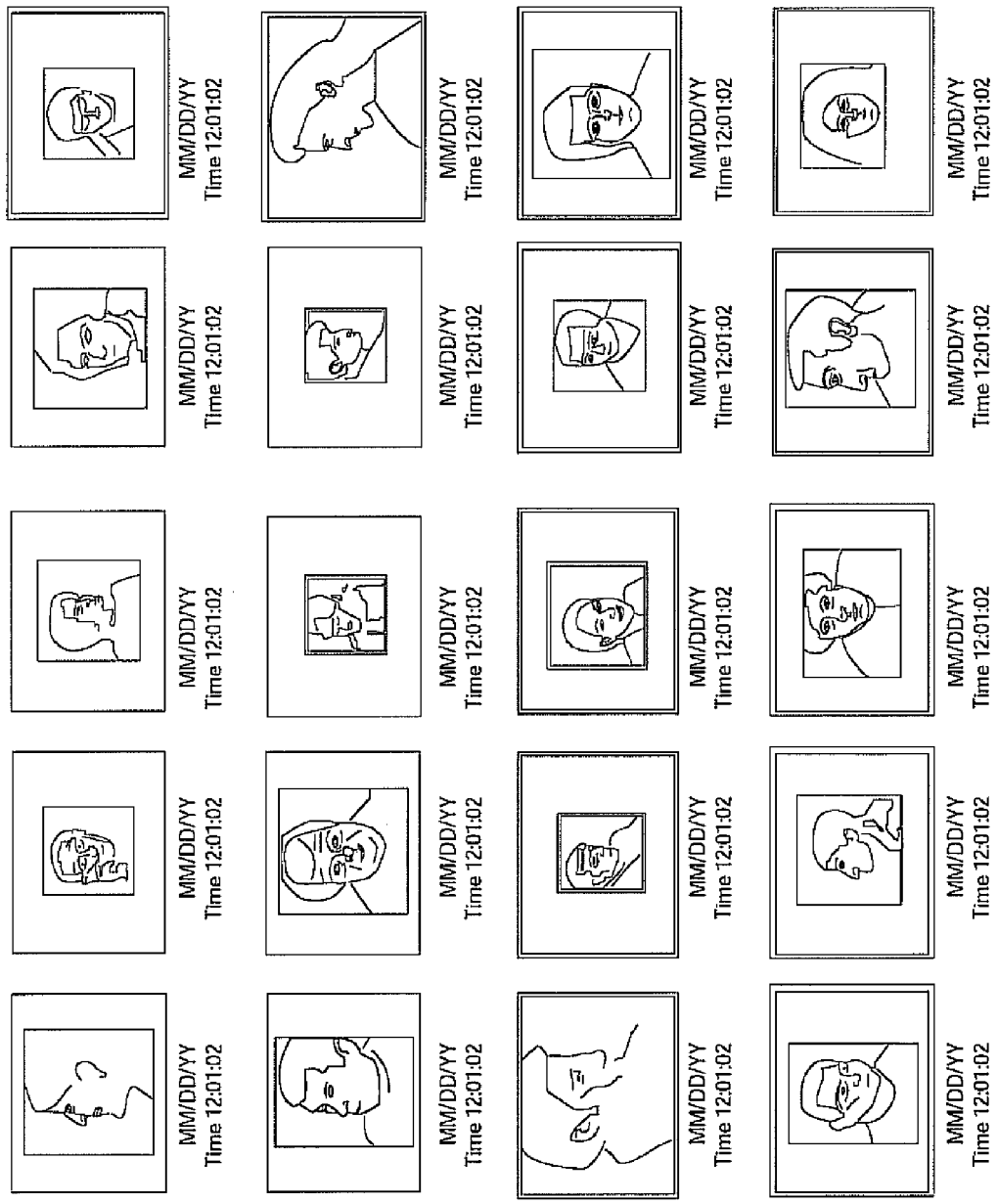
FIG. 5 is a diagram showing a search based only on faces (face keyframes)
Figure 6:
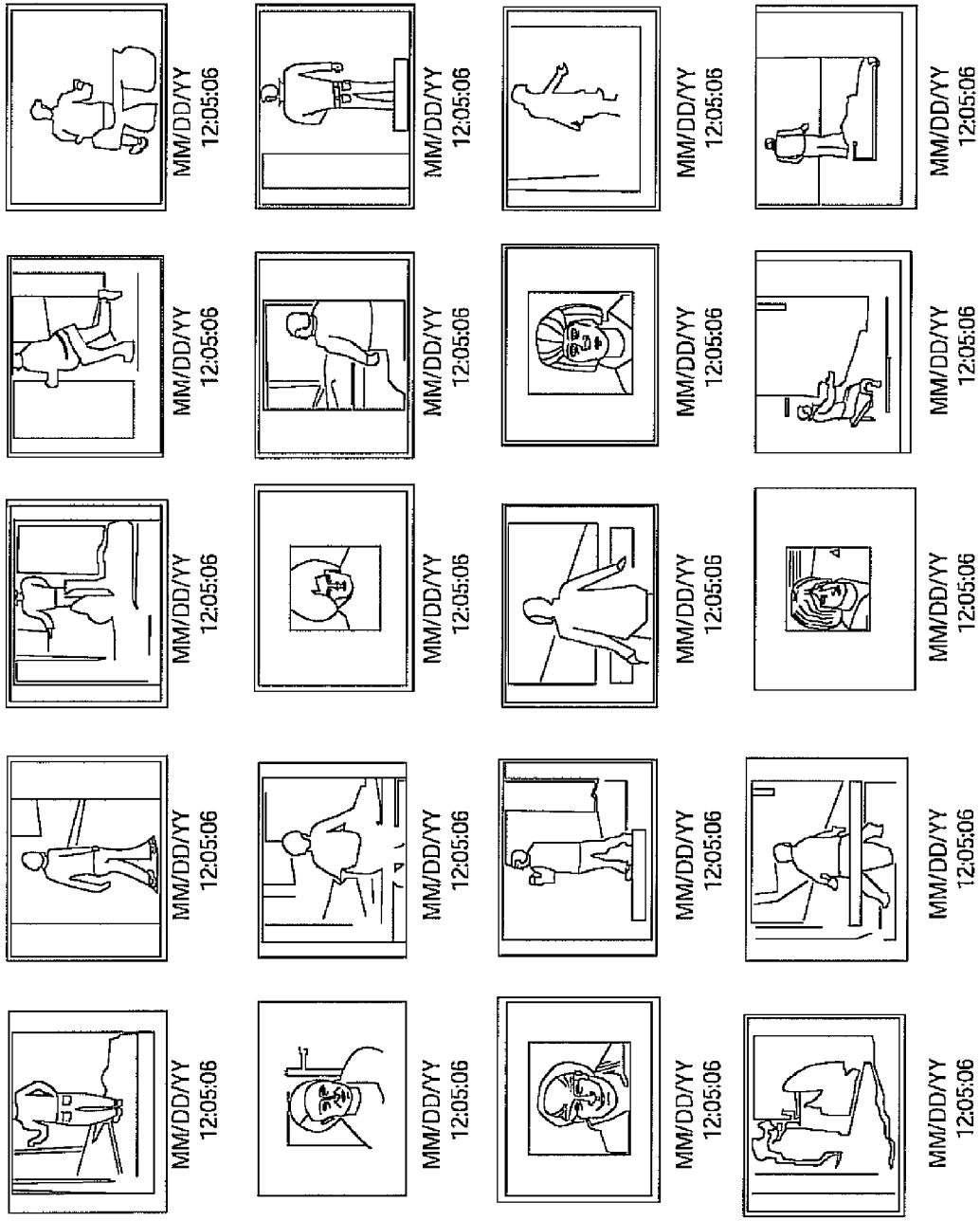
FIG. 6 is a diagram showing a search based on keyframe selection (face and person keyframes)

Referring to FIG. 5, a plurality of face images is shown. The face images include results of a search based only on faces. In FIG. 6, a plurality of face images and person images are shown for a more sensitive search which includes both person and face keyframes.

Referring again to FIG. 4, tracking the face and person along the video sequence is needed to store just a single keyframe of the person/face in the database 314. The same method is employed to track the full person and only his face along the video. A face tracker 306 will now be described, which is applied for person tracking (308) as well, without loss of generality.

Figure 7:
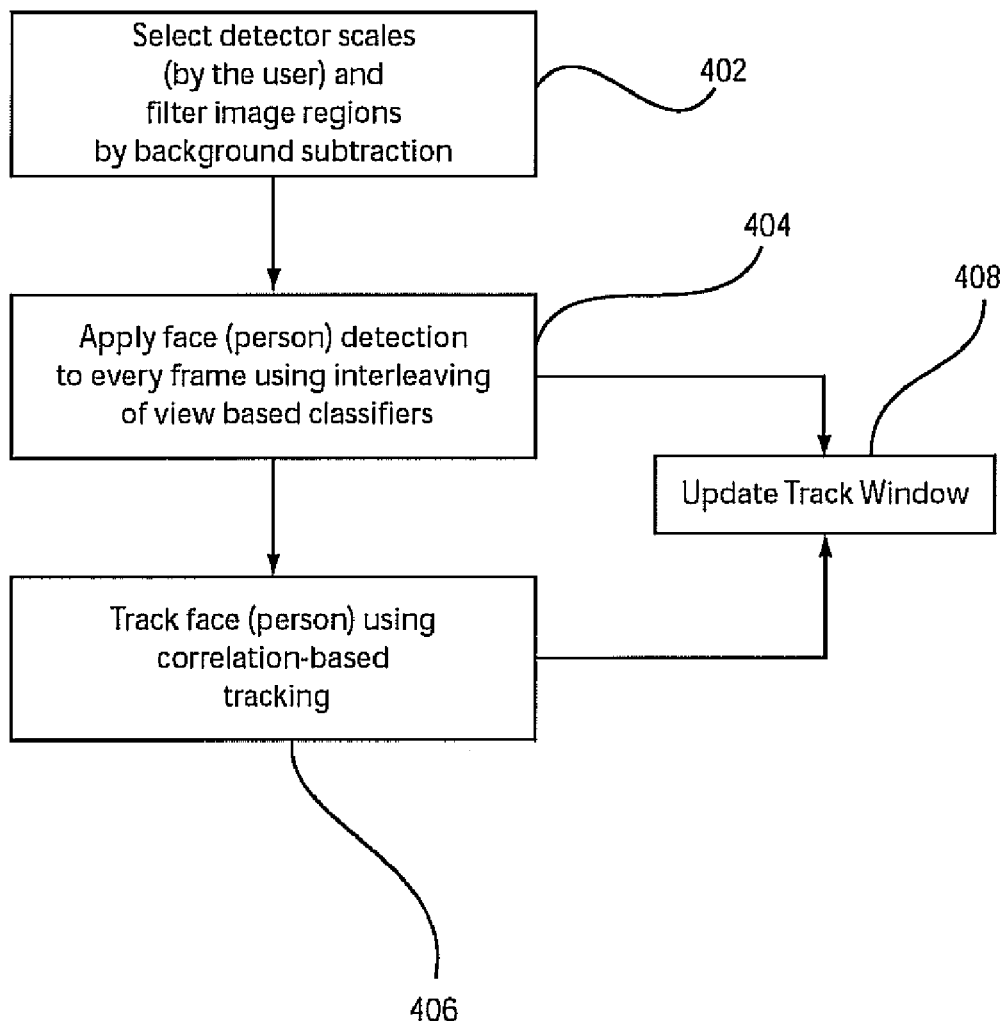
FIG. 7 is a block/flow diagram showing face/person tracking in accordance with another embodiment.

Referring to FIG. 7, a face tracking method in accordance with the present principles is based on applying face detection in every frame of a video sequence. In block 402, a range of possible scales is selected by a user and image regions are filtered by background subtraction. In block 404, the face or person detector is applied using interleaving of view-based classifiers. Note that the classifiers are preferably applied in the regions filtered by background subtraction and in the scales selected by the user. In block 406, once a face (person) is detected, correlation-based tracking is started and a track window is updated in block 408. Note that the window can also be updated by the face (person) detector (404) to avoid drifting.

To keep tracking the face even when the face detector fails, the correlation-based tracker is employed. More specifically, when a face is detected, the correlation-based tracker is triggered. For the subsequent frame, if the face detection fails, tracking is updated with the track window given by the correlation-based tracker. Otherwise, if the face detector reports a window result with close position and size to the current tracking window, then this face detection window result is used to update tracking. This mechanism assists in avoiding drifting.

To improve the efficiency of our detector and permit real-time face tracking performance (25/30 Hz) in conventional desktop computers, the following may be applied. The detector is applied at specific scales provided by the user and at motion regions detected by background subtraction. This assists in limiting the amount of data that needs to be processed. The correlation-based tracking is performed in conjunction with the interleaved classifiers to permit faster frame rates.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An occlusion detection system, comprising:
    a decomposer configured to decompose an image into a set of hierarchical parts;
    a hierarchy of classifiers, including multiple view-based classifiers, employed to detect features in the image and the hierarchical parts; and
    at least one logical operation configured to logically combine a classification result from at least two of the classifiers to detect an occlusion state of the image by determining that no face is detected in an image that has a detected person.

2. The system as recited in claim 1, wherein the occlusion state includes occlusion of a face.

3. The system as recited in claim 1, wherein the hierarchy of classifiers is applied to the image in an interleaved manner.

4. The system as recited in claim 3, wherein the image includes a sequence of images and each of a plurality of classifiers is applied to a next image of the sequence such that each classifier is applied to only one image at a time.

5. The system as recited in claim 4, wherein the classifiers are employed in an order for each successive image.

6. The system as recited in claim 1, wherein the at least one logical operation is configured to logically combine a classification result to permit a plurality of conditions to be met.

7. The system as recited in claim 1, further comprising a security feature configured to be responsive to the occlusion state.

8. The system as recited in claim 7, wherein the security feature includes a secured entry point and the occlusion state decides whether a person is authorized to enter the secured entry.

9. A person detection system, comprising:
a face detector configured to detect a face in an input video sequence by interleaving of multiple view-based classifiers, the face detector outputting a face keyframe to be stored if a face is detected;
a person detector configured to detect a person in the input video sequence if the face detector fails to detect a face, the person detector outputting a person keyframe to be stored, if a person is detected in the input video sequence.

10. The system as recited in claim 9, wherein the face detector includes a hierarchy of classifiers employed in a rule-based combination to detect features in the image.

11. The system as recited in claim 9, wherein the person detector includes a hierarchy of classifiers employed in a rule-based combination to detect features in the image.

12. The system as recited in claim 9, further comprising a user interface configured to search based on keyframe selection that outputs face keyframes if the faces are not occluded, and person keyframes, if the person is present and the face is occluded.

13. The system as recited in claim 9, wherein the face detector is configured to track a face in a video input using correlation-based tracking.

14. The system as recited in claim 9, wherein the person detector is configured to track a person in a video input using correlation-based tracking.

15. The system as recited in claim 14, wherein the person detector is configured to detect a person in the video using interleaving of multiple view-based classifiers.

16. A method for occlusion detection, comprising:
decomposing an image into a set of hierarchical parts;
detecting features in the image and the hierarchical parts using a hierarchy of classifiers, including multiple view-based classifiers; and
logically combining classification results from at least two of the classifiers to detect an occlusion state of the image by determining that no face is detected in an image that has a detected person.

17. The method as recited in claim 16, wherein the occlusion state includes occlusion of a face.

18. The method as recited in claim 16, wherein the occlusion state includes a non-occluded face.

19. The method as recited in claim 16, further comprising interleaving usage of the hierarchy of classifiers applied to the image.

20. The method as recited in claim 19, wherein the image includes a sequence of images and each of a plurality of classifiers is applied to a next image of the sequence such that each classifier is applied to only one image at a time.

21. The method as recited in claim 20, wherein the classifiers are employed in an order for each successive image.

22. The method as recited in claim 16, wherein logically combining classification results permits a plurality of conditions to be met.

23. The method as recited in claim 16, further comprising providing access to an entry point responsive to the occlusion state.

24. The method as recited in claim 16, further comprising searching images based on keyframe selection that outputs face keyframes if the faces are not occluded, and person keyframes, if the person is present and the face is occluded.

25. The method as recited in claim 16, wherein detecting features includes tracking a face in a video input using correlation-based tracking.

26. The method as recited in claim 16, wherein detecting features includes interleaving of multiple view-based classifiers.

27. The method as recited in claim 16, wherein detecting features includes tracking a person in a video input using correlation-based tracking.

28. The method as recited in claim 16, further comprising detecting a face mask even if a face is fully occluded.

29. The method as recited in claim 16, further comprising generating real-time alerts for security in case a face mask is detected.

30. The method as recited in claim 16, further comprising generating real-time alerts for security in case a face mask is not detected.

31. A computer program product for occlusion detection comprising a non-transitory computer useable storage medium including a computer readable program, wherein the computer readable program when executed on a computer causes the computer to perform the steps of:
decomposing an image into a set of hierarchical parts;
detecting features in the image and the hierarchical parts using a hierarchy of classifiers, including multiple view-based classifiers; and
logically combining classification results from at least two of the classifiers to detect an occlusion state of the image by determining that no face is detected in an image that has a detected person.

32. The occlusion detection system of claim 1, wherein the at least one logical operation includes at least one of AND, NOT, and OR.

* * * * *